Figure 1:
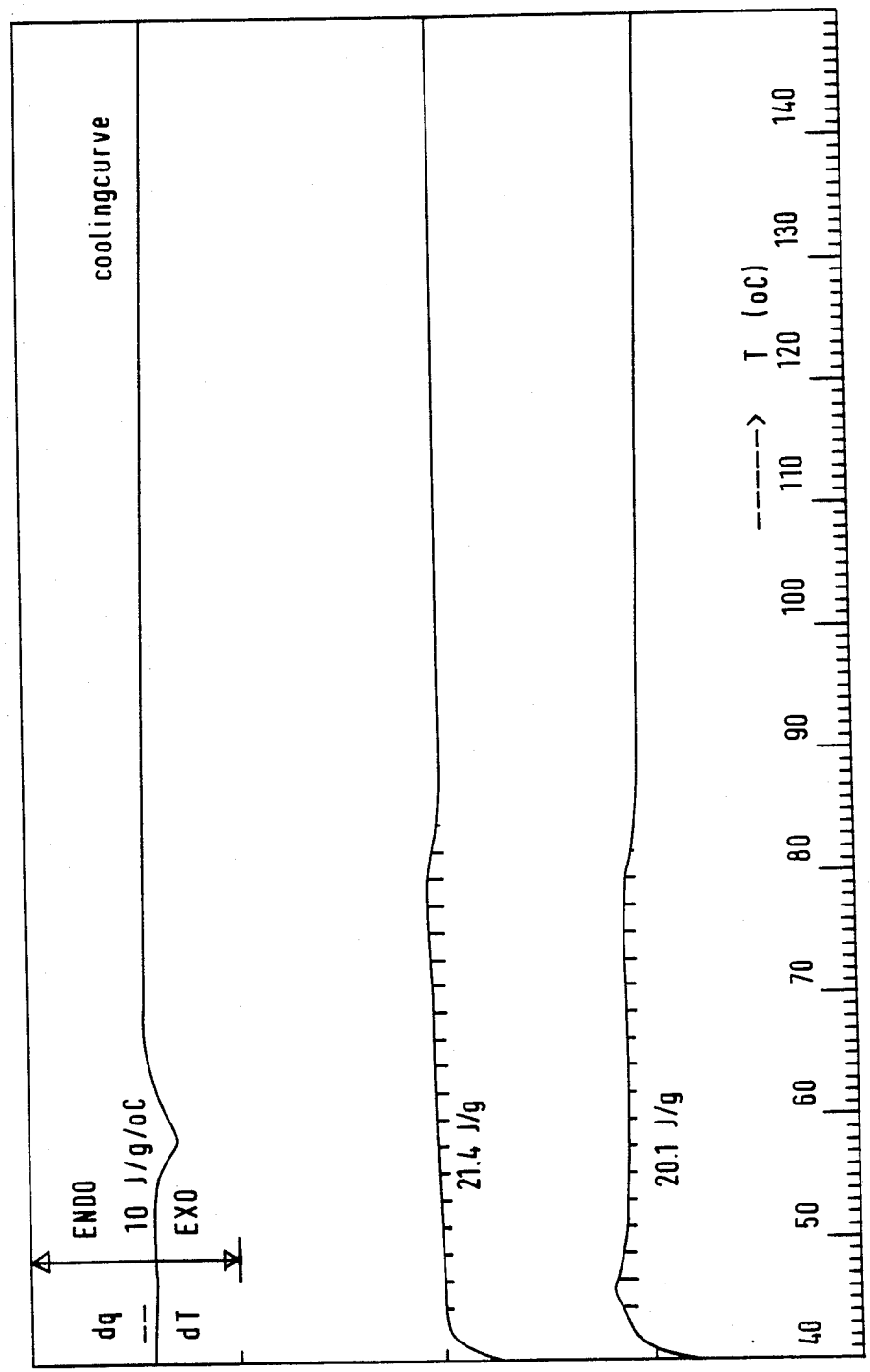

United States Patent [19]

Van Der Groep

[11] Patent Number: 4,877,827

[45] Date of Patent: Oct. 31, 1989

[54] POLYMER COMPOSITION, A PROCESS FOR PRODUCING A POLYMER COMPOSITION, AND THE USE OF SUCH A POLYMER COMPOSITION

[76] Inventor: Lambertus A. Van Der Groep, Gersthove 33,, 1112 HN Diemen, Netherlands

[21] Appl. No.: 167,697

[22] Filed: Mar. 14, 1988

[30] Foreign Application Priority Data

Mar. 13, 1987 [NL] Netherlands ........................ 8700606
May 20, 1987 [NL] Netherlands ........................ 8701208

[51] Int. Cl.$^4$ .................... C08L 23/20; C08L 23/16; C08L 23/08; C08L 31/04
[52] U.S. Cl. .................................. 524/477; 524/487; 524/524; 525/211; 525/222; 525/198; 525/84; 525/97; 525/98; 525/99; 525/148; 525/166; 525/179
[58] Field of Search ............... 525/222, 211; 524/477, 524/487, 524

[56] References Cited

U.S. PATENT DOCUMENTS

| | | | |
|---|---|---|---|
| 3,205,186 | 9/1965 | Zaayenga | 524/477 |
| 3,361,852 | 1/1968 | Bassett et al. | 525/222 |
| 3,386,925 | 6/1968 | Dillhoefer | 260/2.3 |
| 3,489,710 | 1/1970 | Bonotto et al. | 260/33.6 |
| 3,821,333 | 6/1974 | Goodwin et al. | 260/897 |
| 3,941,859 | 3/1976 | Batink et al. | 525/211 |
| 4,000,140 | 12/1976 | Tierney | 260/28.5 |
| 4,032,600 | 6/1977 | McAdams et al. | 525/211 |
| 4,137,362 | 1/1979 | Miki et al. | 428/337 |
| 4,335,034 | 6/1982 | Zuckerman et al. | 524/423 |
| 4,537,935 | 8/1985 | Yoshimura et al. | 525/222 |
| 4,639,487 | 1/1987 | Hazelton et al. | 524/425 |
| 4,713,419 | 12/1987 | Takimoto et al. | 525/211 |

FOREIGN PATENT DOCUMENTS

| | | |
|---|---|---|
| 4313 | 7/1979 | European Pat. Off. . |
| 1694572 | 2/1968 | Fed. Rep. of Germany . |
| 62187779 | 8/1987 | Japan ..................................... 525/98 |

OTHER PUBLICATIONS

Kunstsoffe, 70 (1980) 12, pp. 844–849,—"Method for Determination The Toughness of Plastics", Ing. A. T. Son.

Primary Examiner—Carman J. Seccuro
Attorney, Agent, or Firm—Fleit, Jacobson, Cohn, Price, Holman & Stern

[57] ABSTRACT

This invention relates to a polymer composition comprising
(a) 30–70 parts by weight of one or more ethylene-propylene-diene rubbers,
(b) 30–70 parts by weight of one or more ethylene-vinyl acetate copolymers with a vinyl acetate content of 18–40% by weight, and
(c) 1–25 parts by weight of one or more other polymers.

The composition can be used with advantage, among other purposes for improving the miscibility of synthetic resins.

12 Claims, 3 Drawing Sheets

POLYMER COMPOSITION, A PROCESS FOR PRODUCING A POLYMER COMPOSITION, AND THE USE OF SUCH A POLYMER COMPOSITION

This invention relates to a polymer composition, the production thereof, and the use thereof.

In the plastics industries, it is well known that polymers are generally incompatible with each other. Incompatibility is the rule, and compatibility occurs by way of exception only. As, however, there is a continued demand for plastics for all sorts of new applications, while the number of really new plastics is very limited, there is an increasing search for blends of plastics to combine certain desirable properties of the several plastics with each other. However, owing to the incompatibility of the plastics, a blend of plastics more often than not does not give the sum of the good properties, but the sum of the bad properties of both components, whereas it is the good properties which are lost.

Much work has been done in research for polymers which are compatible with each other in compositions in specific ratios. One possibility is modifying one or both of the components. Another approach towards realizing compatibility is to add an additional component which is compatible with both polymers and functions as a kind of polymeric emulsifier.

In certain cases, in mixing polymers, the preference is for there being no compatibility between the components, but for these to exist in different phases, it being the intention that one of the phases is continuous, whereas the other phase acquires the form of discontinuous particles. This situation is found especially in making rubber-reinforced plastics, on the basis of a continuous thermoplastic matrix phase, with a finely-divided rubber therein. If the adherence between the matrix phase and the rubber particles is sufficiently high, the incorporation of the rubber in the matrix phase results in a particularly strong enhancement of the mechanical properties, such as impact strength and the like. Well-known examples of such polymer compositions are ABS, high-impact polystyrene, rubber-modified nylon, and the like. One requirement for producing a high impact strength, however, is that there should be a chemical or physical bond of the disperse rubber phase to the continuous matrix phase. In the known, rubber-modified styrene polymers, this is achieved by grafting monomers corresponding to the monomers forming the polymer of the continuous matrix phase to the rubber particles. This gives a kind of anchorage of the disperse rubber phase. Another approach towards accomplishing this bond is to use an adjuvant which acts as a polymeric emulsifier, e.g. as described in US pat. Nos. 4,341,884 and 4,341,885.

From the point of view of flexibility of product composition and application, it is of course preferable to use additives to the polymer system, because these may have the advantage of being suitable for use throughout a larger range of ratios and polymers. Up until now, however, there has always been the problem that it was impossible to enhance the compatibility of all sorts of polymers, irrespective of their composition, with each other on the basis of one product.

European patent application No. 92318 describes blends of polyolefin plastics with elastomeric plasticizers, which plasticizers, according to the specification of that application, may consist of mixtures of a polyethylene component, which may include an ethylene vinyl acetate copolymer, an olefinic elastomer and a hydrocarbon oil. Although such a composition is capable of improving a number of properties of, for example, film forming polyolefin, the effect of this elastomeric plasticizer is still insufficient.

The international patent application 8000707 relates to mixtures of PVC or CPVC with olefinic elastomers, to which 10-60% by weight of chlorinated polyethylene or EVA have been added. This publication relates to enhancing the phase compatibility of elastomers with relatively rigid polymers, and, for this purpose, teaches the use of ethylene vinyl acetate or chlorinated polyethylene. Here again, a product of good utility is not obtained.

U.S. Pat. No. 3,941,859 relates to physical blends of EPDM with polyethylene and an ethylene vinyl acetate copolymer. This product is used for making all sorts of articles, such as tubing, cable insulation, mats, shoe soles, toys, household appliances, and the like.

European patent application No. 4313 relates to thermoplastic mixtures of EPDM, a large proportion of crystalline polypropylene and a copolymer of ethylene and vinyl acetate. According to the examples, the starting product is ethylene vinyl acetate copolymers with a high vinyl acetate concentration, generally prepared by emulsion polymerization. Here again, the prior application is concerned with a specific composition, in which an ethylene vinyl acetate copolymer is used for enhancing the compatibility between polypropylene, on the one hand, and EPDM, on the other.

It is an object of the present invention to provide a polymer composition capable of enhancing the compatibility and miscibility of plastics with each other, while at the same time, if desired, it may improve a large number of other properties of the plastics.

The invention accordingly provides a polymer composition comprising
  (a) 30-70 parts by weight of one or more ethylene-propylene-diene rubbers,
  (b) 30-70 parts by weight of one or more ethylene vinyl acetate copolymers with a vinyl acetate concentration of 18-40% by weight, and
  (c) 1-25 parts by weight of one or more other polymers.

The polymer composition according to the invention can be used for a large number of applications. One important use of the polymer composition of the invention is improving the impact strength, i.e., the mechanical strength of plastics, which, by themselves, need not have a very high impact strength. Examples of such plastics are polystyrene, styrene acrylonitrile copolymers, polyesters, nylons, polyolefins, such as polyethylene or polypropylene, polycarbonates, polyphenylene oxide and the like.

It is also possible, however, for the polymer composition according to the invention to be used as a kind of coupling agent between different phases of a polymeric dispersion, e.g. as a compatibilizer. One example of this application is the distribution of inorganic fillers in polymers, such as glass fibres, carbon fibres, metal fibres, pigments, silicates, mica, alumina, metal powder, and the like.

The polymer composition according to the invention is also effective, however, to promote the miscibility of polymers which are intrinsically immiscible, or which are poorly miscible, such as polypropylene and styrene polymers, polyolefins and plasticized or non-plasticized PVC, etc.

Further functions of the polymer composition, in particular when it is provided with supplementary additives to be described hereinafter, are improvement of flow improvement of release, improvement of gloss, protection from ozone influences, and protection of materials which are apt to become burnt at relatively low temperatures.

In this connection it is noted that it is known to use copolymers of ethylene and vinyl acetate in butadiene rubber for improving its ozone resistance.

The one or more other polymers that can be used as a component comprise in principle all thermoplastic or elastomeric plastics, naturally with the exception of EPDM and EVA, as these form part of components a and b.

In the polymer composition, the preferred component c is a styrene butadiene rubber, a styrene butadiene block copolymer, a butadiene acrylonitrile rubber, a butyl rubber, an isoprene rubber, a polybutadiene rubber, one or more olefinic polymers or mixtures of two or more of these products.

The choice of this component is largely determined by the contemplated use of the product.

When used as an additive for rubbers or rubbery products, a styrene-butadiene rubber or a styrene-butadiene block copolymer can be used with advantage.

Branched olefinic polymers, such as LDPE or LLDPE, i.e., olefinic polymers with long-chain or short-chain branching can also be used with advantage in a polymer composition for addition to, e.g., butyl rubber or polystyrene.

The melt index of the polymer composition according to the invention is preferably between 0.25 and 0.9 dg/min (230° C., 2.16 kg/cm$^2$). In this connection it is of importance to note that the melt index is influenced by the reaction in the extruder between the components of the polymer composition according to the invention. In fact, when this proceeds too far, a certain degree of decomposition occurs, which is expressed in an increase in melt index. Generally speaking, therefore, the melt index of the polymer composition according to the invention is preferably no higher than 2.0, more preferably no higher than 1.5, and most preferably less than 1.0.

The ratio of the components of the polymer composition according to the invention is determined at least in part by the contemplated application. Generally speaking, an increase of the content of the third component, and especially when olefin polymers are used as the third component, leads to an improvement in flow. This also applies to a wax, if used.

The ratio of EPDM/EVA is preferably as close to 1 (weight/weight) as possible to ensure optimum effect as regards the enhancement of the miscibility of plastics with each other.

A preferred embodiment of the invention is characterized by the use in the polymer composition of one or more branched ethylene polymers, for example, a combination of an ethylene-butene-1 and an ethylene-hexene-1 copolymer, which each may have a comonomer concentration of 1-15 mole %.

In a preferred embodiment of the polymer composition according to the invention, component a) consists of two different ethylene-propylene-diene rubbers. The differences between these rubbers may reside in various aspects thereof, for example, ethylene content, propylene content, diene content, nature of the diene, such as dicyclopentadiene, ethylidene-norbornene, or 1,4-hexadiene, Mooney viscosity of the rubber, distribution of the monomers over the rubber, which aspects may express themselves, e.g. in the higher or lower green strength, i.e. the strength in the uncured state. The use of at least one rubber having a reasonable green strength is preferred, as this results in better properties of the end product in which the polymer composition is incorporated.

The preparation of such rubbers is known (Ullmann, Encyklopädie der technischen Chemie, 4th Edition, Volume 13, pp. 619-621). In the main, vanadium-type catalysts are used. By controlling the content of diene, the degree of unsaturation can be adapted. Usual values therefor are 3-20 double bonds per 1000 C atoms. The Mooney viscosity generally ranges between 30 and 125 (1-4/100° C.). The ethylene content of the rubbers may range between 45 and 80% by weight.

The preferred component (b) is an ethylene vinyl acetate copolymer with a vinyl acetate content ranging between 25 and 30% by weight. A vinyl acetate content within this range is preferred, as the degree of enhancement of properties is strongest at a vinyl acetate content within this range. An explanation therefor is not available at present, but it has been found that at different contents of vinyl acetate, either the universal applicability of the product, or the impact strength of the resulting end product is adversely affected.

The ethylene-vinyl acetate copolymers are generally prepared using a high-pressure process, in which a radical polymerization is carried out using pressures of more than 1000 bar.

The preferred EVA copolymers have a melt index of 0.5 to 25 dg/min.

Preferably, one or more waxes are incorporated in the polymer composition according to the invention, which have a positive effect on the flow behaviour, mould release and the like. Suitable waxes are polyolefin waxes, in particular polypropylene waxes, which is often low-molecular amorphous polypropylene.

Preferably, two or more polypropylene waxes are used in combination, with the melt flow indices of these waxes being different. By virtue of such a selection of waxes to be added, an optimum polymer composition is obtained, with a clearly improved pattern of properties.

Such polyolefin waxes, in particular polypropylene waxes are known and commercially available. Melt flow indices used range between about 10 and 300.

As stated before, the polymer composition of the invention may contain various types of EPDM rubber, it being specifically preferred that one or more of the types used is a green-strength rubber. The ethylene-propylene-diene rubbers may be conventional, commercially available rubbers. Furthermore, preferably one or more heat stabilizers and one or more antioxidants are incorporated in the polymer composition. Suitable compounds for these purposes are the thiopropionates, such as DLTDP or DSTDP, and phenolic antioxidants. However, other compounds having the desired effect may be used.

It is not entirely clear why the polymer composition according to the invention has the unique combination of properties found. It is suspected that, in preparing the polymer composition, a reaction occurs between the ethylene-propylene-diene rubber, on the one hand, and the copolymer, on the other, to form a kind of adduct. By itself, however, this does not appear to provide a full explanation of the particularly good properties of the polymer composition.

One of the characteristic aspects of the polymer composition according to the invention is that a plastic incorporating the polymer composition can often be reprocessed a large number of times, in some cases as many as ten times.

The invention also relates to a process for preparing the polymer composition according to the invention, which is characterized by supplying to an intake zone of an extruder
- (a) one or more ethylene-propylene-diene rubbers,
- (b) one or more ethylene-vinyl acetate copolymers with a vinyl acetate content of 18-40% by weight,
- (c) one or more other polymers, and
- (d) optionally other polymeric and non-polymeric additives mixing the ingredients, and reacting them at a temperature of the melt of no more than 300° C., and subsequently cooling and granulating the resulting product.

The products preferably used in the process, and the quantities thereof, are described in detail hereinbefore, which description also applies to the process.

The lower limit of the temperature of the melt is determined mainly by the melting range of the highest melting component. This lower limit will generally be not lower than 80° C., although the polymer composition produced may have a melting range between 25° and 100° C., specifically between 40° and 80° C.

For the polymer composition according to the invention it is of importance that the components have reacted at least partially with each other, which, for example, can be expressed in the fact that the infrared spectrum contains peaks which do not correspond to peaks of the unreacted starting products. Certain combinations of components may give rise to peaks which appear to indicate the presence of polystyrene, while the starting products do not comprise styrene.

The invention further relates to the application of the polymer composition described above, or the polymer composition prepared by the process according to the invention in other plastics.

The invention is accordingly characterized by a thermoplastic moulding composition comprising at least one thermoplastic synthetic material, preferably in a proportion of 70-99.9% by weight, the polymer composition according to the invention in a proportion of 0.1-30% by weight, preferably no more than 10% by weight, and 0-5% by weight of polymeric or non-polymeric additives.

The thermoplastic synthetic material component of the above moulding composition may be virtually any thermoplastic and/or elastomeric plastic, either the plastic in the pure form, or in admixture with one or more other thermoplastic synthetic resins or rubbers. Suitable plastics are polyolefins, such as high and low density polyethylene, polypropylene, polybutene, polystyrene and styrene polymers, such as SAN, ABS, SBS, HIPS, MIPS, polyesters, such as polyethylene terephthalate, and PBTP, polyamides, such as nylon 6, nylon 66, nylon 46, nylon 612, aramide, polycarbonate, polyetherimide, SBR, NBR, chlorobutyl rubber, polybutadiene, BAN, etc. The addition of the polymer composition to these plastics as such generally gives a clear improvement of a large number of properties of the plastic, such as flow, mechanical properties and extruder output.

Much clearer, however, the effect can be in the case of mixtures of two or more plastics, for example, of two thermoplastic synthetic resin or of one thermoplastic synthetic resin with a rubber, where the presence of the polymer composition according to the invention makes it possible for materials which hitherto have been regarded as utterly incompatible, to be blended and processed into a homogeneous mixture. Examples are mixtures of polypropylene with high density polyethylene, polypropylene with polystyrene and polypropylene with SBS.

A major advantage of the invention is that PP can be modified with HDPE, to give a product having good low-temperature properties, such as impact strength at low temperature. In this way, one type of PP can be used to replace virtually all copolymer types.

Blends of PP (raffia grade) with LDPE and the polymer composition according to the invention have extremely good yarn properties, which make it possible for this product to be used for a large number of applications for which PP was originally utterly unsuitable.

In a preferred embodiment of the invention, the moulding composition comprises 90-99 parts by weight of PVC, 1-10 parts by weight of the polymer composition according to the invention, and up to 5 parts by weight of conventional additives. It has surprisingly been found that this moulding composition gives no processing problems whatsoever. PVC, for example, is notorious for being rather difficult to process, partly because it is prone to become burnt when exposed to high temperatures. With the moulding composition according to the invention, this phenomenon does not occur at all. On the contrary, PVC can be subjected to very high temperature, such as 350° C., without there being any form of burning. As a result, PVC can be blended with ABS to form high-impact, flame-resistant ABS-PVC mixtures, which hitherto has hardly, if at all, been possible.

An additional advantage of the moulding composition according to the invention on the basis of PVC is the greatly improved split resistance and impact strength. It is now possible for PVC to be nailed without splitting. This is of importance specifically for corrugated sheets or roof sheeting.

Surprisingly it has further been found that the moulding composition according to this embodiment of the invention exhibits no static charging at all, which is of great importance in particular for the manufacture of gramophone records.

Another embodiment of the invention concerns a moulding composition having barrier properties. Such a moulding composition is characterized in that it substantially consists of a blend of
- (1) 60-95 parts by weight of a thermoplastic synthetic material having no substantial barrier properties;
- (2) 5-40 parts by weight of a plastic imparting barrier properties; and
- (3) 0.5-10 parts by weight of the polymer composition according to this invention.

Preferably, the thermoplastic synthetic material (1) is selected from ABS, LLDPE, LDPE, HDPE and PP, and plastic (2) is selected from nylon, PBTP, and PETP, ethylene vinyl alcohol polymer and fluorine containing polymers. Specifically, the component imparting gas barrier properties is present in a proportion of 5-40% by weight, calculated on the total moulding composition. It is only in the case of the combination ABS-nylon 6 that the proportion of ABS is limited to about 35% by weight, because it is very difficult, if not downright impossible to obtain a good dispersion with higher ABS concentrations.

It is noted in this connection that a distinction can be made between gas barrier properties and chemical barrier properties.

Gas barrier properties are especially of importance for products which come into contact with food, such as foil, bottles and the like. An important feature in this connection is that no $O_2$, and sometimes $CO_2$, can diffuse through the material. Barrier materials coming into contact with food are often based on polyethylene, such as HDPE, LDPE and LLDPE.

In a specific preferred embodiment, LDPE and/or LLDPE is combined with nylon 6, which gives a product from which a monolayer barrier foil or container can be made. By using such a moulding composition according to the invention, there is no need to make laminates. Furthermore, a foil made of such a moulding composition has good sealing properties.

In this connection the term "gas barrier properties", as used herein, means an $O_2$ permeability of less than about 50 $cm^3$ mm $m^{-2} d^{-1} bar^{-1}$ at 23° C., while products having values of more than 100 are regarded as having no substantial gas barrier properties.

To obtain chemical barrier properties, which is in particular of importance for the packaging of solvents, such as white spirit, thinner, paraffin etc., often polyesters such as PETP or PBTP are used, compounded with propylene polymer or copolymer. In this connection it is not very important whether the material has been stretched or not. Naturally it is well known that stretched polyester also has gas barrier properties.

In another embodiment of the invention, the moulding composition consists of polypropylene or a propyleneethylene copolymer with an ethylene content of 5-40 mole %, polystyrene or SBS and the polymer composition according to the invention in a preferred ratio of 60-85:15-40: 1-10, respectively, as parts by weight. It has surprisingly turned out that such moulding compositions have an excellent impact strength, especially as low temperature ($-20°$ C.), combined with a good stiffness.

Still another preferred embodiment of the invention concerns flame-retardant moulding compositions on the basis of polyolefins and chlorine containing polymers. In combination with the polymer composition, LDPE, LLDPE, HDPE, and polypropylene (including copolymers) can be mixed with PVC, Cl-PVC en/of Cl-PE to form a compatible mixture.

Suitable contents of the chlorine containing polymer are substantially determined by the desired flame-retardant properties, but will generally range between 10 and 25% by weight, calculated on the final product.

The polymer composition according to the invention is used in all moulding compositions according to this invention, and is responsible for the particular products of the moulding compositions.

Other applications of the polymer composition according to the invention are improving the properties of polystyrene foam (preventing crumbling), improving the impact strength of thermoplastic polyurethanes, the stabilization of the bubble in film extrusion of olefin polymers, improving the glass distribution in glass filled plastics, preventing orientation in products made with high molecular HDPE, improving the processability of mixtures of high molecular HDPE by means of LLDPE and processing scrap of synthetic materials, such as polycarbonate and PETP (off-spec, etc.) to useful products.

The polymer composition according to the invention can be incorporated into a synthetic material in various ways. The method most commonly used is to make a dry mix of the various components of the final product, which mix is supplied to a processing machine. However, the components may also be mixed in a high-speed mixer. In still another embodiment, however, a solution is made of the polymer composition, for example, in styrene or any other suitable solvent. In particular for incorporating the polymer composition into liquid systems, such as polyurethane forming mixtures or polyesters, the use of a solution may be of advantage. In such a situation it may also be of advantage if the polymer composition has reactive groups, such as vinyl or hydroxyl groups.

It is further of importance to note that the polymer composition according to the invention cannot be regarded as a polymeric emulsifier without more ado. In fact, in mixtures of two or more synthetic materials, the components are often so compatible under the influence of the composition according to the invention that a homogeneous mixture is obtained, in which hardly, if at all, any separate phases can be distinguished.

A very important application of the polymer composition according to this invention is concerned with the processing of plastics waste. A clear example are the soft drink bottles on the basis of polyester and polyethylene. Up until now it has not been possible to re-use these bottles, or the material thereof in a useful manner, because when re-processed, a non-compatible mixture of polyester and polyethylene was formed. By adding a relatively small quantity of the polymer composition according to this invention, the mixture can be excellently re-used. Another example is the processing of printed or papered crates of HDPE. Owing to the presence of the non-polymeric contamination it has hitherto been difficult for these materials to be processed into other articles. When a quantity of the polymer composition of this invention is mixed with the recycle material, no problems are encountered. This is also the case in the processing of synthetic materials from domestic refuse. This material is of rather diverse origin, so that it was actually hardly possible for it to be processed into useful products. The reason was especially that the various components, such as polyethylene and PVC, but also polystyrene were hardly if at all compatible with each other. With a quantity of the polymer composition of the present invention this compatibility problem can virtually always be solved.

The polymer composition according to the invention is also very useful in rubbers, where it is not so much the compatibility with other polymers that is improved, but the physical properties, ozone resistance and the like. By adding 0.1-30% by weight, preferably 0.1-10% by weight, of the polymer composition according to the invention to any given rubber, such as natural rubber, styrene butadiene rubber, butadiene acrylonitrile rubber, SBS, polybutadiene rubber, butyl rubber, chlorobutyl rubber, polyisoprene, chloroprene rubber and the like, in the vulcanized or unvulcanized state, a significant improvement of various mechanical properties is obtained.

The polymer composition according to the invention makes it possible to mix rubbers into virtually any synthetic resin in various proportions. Furthermore, the polymer composition is extremely useful when applied instead of treating synthetic resin mixtures with γ-radiation.

Another application of the polymer composition according to the invention is the provision of a universal colour master batch or colour concentrate, whereby a mixture of a colouring material, the polymer composition according to this invention, and optionally an inert carrier, such as a synthetic plastics, can be mixed with virtually all synthetic resins with a high concentration of colouring matter, without there being any compatibility problems. In fact, up until now it has been necessary to use a separate carrier for the colouring matter for each plastic or group of plastics. The polymer composition according to this invention can function as a universal carrier for all synthetic resins.

Conventional colour concentrates contain 20–80% by weight of pigment and 80–20% by weight of carrier. The concentrates according to this invention may have the same concentrations, with the carrier component consisting of 40–100% by weight of the polymer composition according to the invention and 0–60% by weight of a different carrier, such as LDPE.

The invention is illustrated in and by the following examples, which are not intended to limit the invention in any way. Unless otherwise indicated, all parts and percentages are by weight.

EXAMPLE 1

To a twin-screw extruder, 50 parts of ethylene- propylene-diene rubber (25 parts EPDM with an ethylene content of 55%, ethylidene norbornene and dicylopentadiene as the diene component; 25 parts EPDM with an ethylene content of 70%, dicyclopentadiene as the diene component), 48 parts ethylene-vinylacetate copolymer containing 28% VA and having a melt flow index of 9, 2 parts of polypropylene wax (mixture of waxes having a melt flow index of 20 and 200) and 25 parts of SBS were supplied.

In the extruder, these components were mixed and reacted at a temperature of the melt of 200°–250° C. Subsequently the mixture was extruded and granulated.

EXAMPLE 2

The process of Example 1 was repeated, using, instead of 25 parts of SPS, 25 parts of butadiene-acrylonitrile rubber.

EXAMPLES 3–8

In the manner described in Example 1 a number of polymer compositions were prepared with different proportions of components. These proportions are specified in the following Table A.

TABLE A

| Example | 3 | 4 | 5 | 6 | 7 | 8 |
|---|---|---|---|---|---|---|
| EPDM (parts)[1] | 50 | 40 | 47.5 | 40 | 45 | 50 |
| EVA (parts)[2] | 45 | 40 | 47.5 | 50 | 45 | 40 |
| LLDPE (parts)[3] | 3 | 20 | 5 | 10 | 10 | 10 |
| Wax (parts)[4] | 2 | — | — | — | — | — |

[1]Ethylene-propylene-diene rubber, ethylene content 70%; dicyclopentadiene as the third monomer.
[2]Ethylene-vinyl acetate copolymer, 28% VA; melt index...
[3]Linear low-density polyethylene, hexene-1, as comonomer.
[4]Polypropylene wax having a melt index of 100 dg/min.

With regard to the product of Example 7, DSC and torsion-pendulum curves have been determined. FIG. 1 shows the DSC curves over the temperature range of 40°–150° C. The melting range of about 40° C. to about 80° C. is apparent. The middle curve is the first warming-up curve, the uppermost curve is the cooling curve and the lowermost one is the second warming-up curve.

Figure 2:
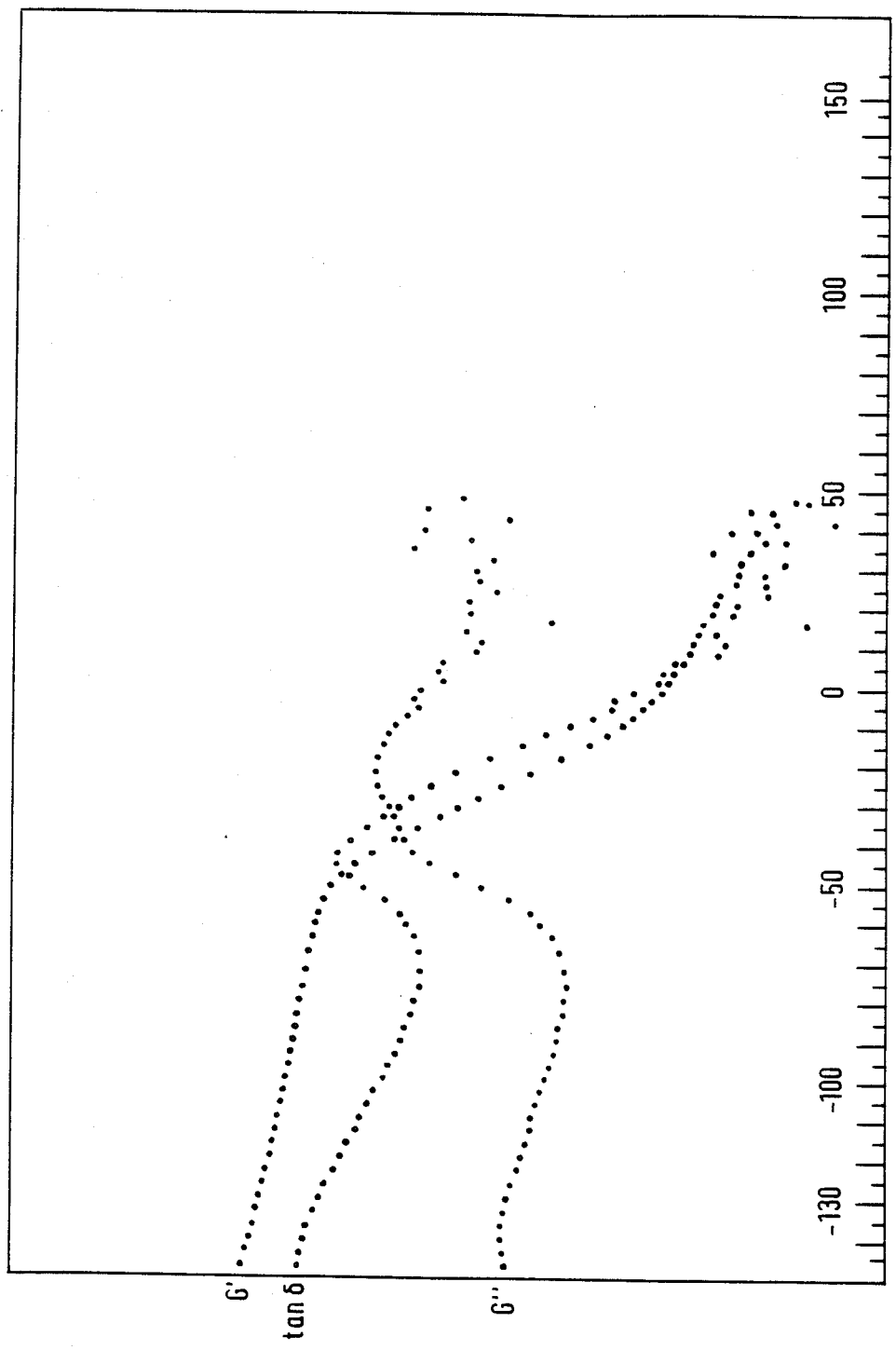

FIG. 2 shows the torsion-pendulum curve of this product. It clearly shows the glass transition temperatures at about −45° C.

Figure 3:
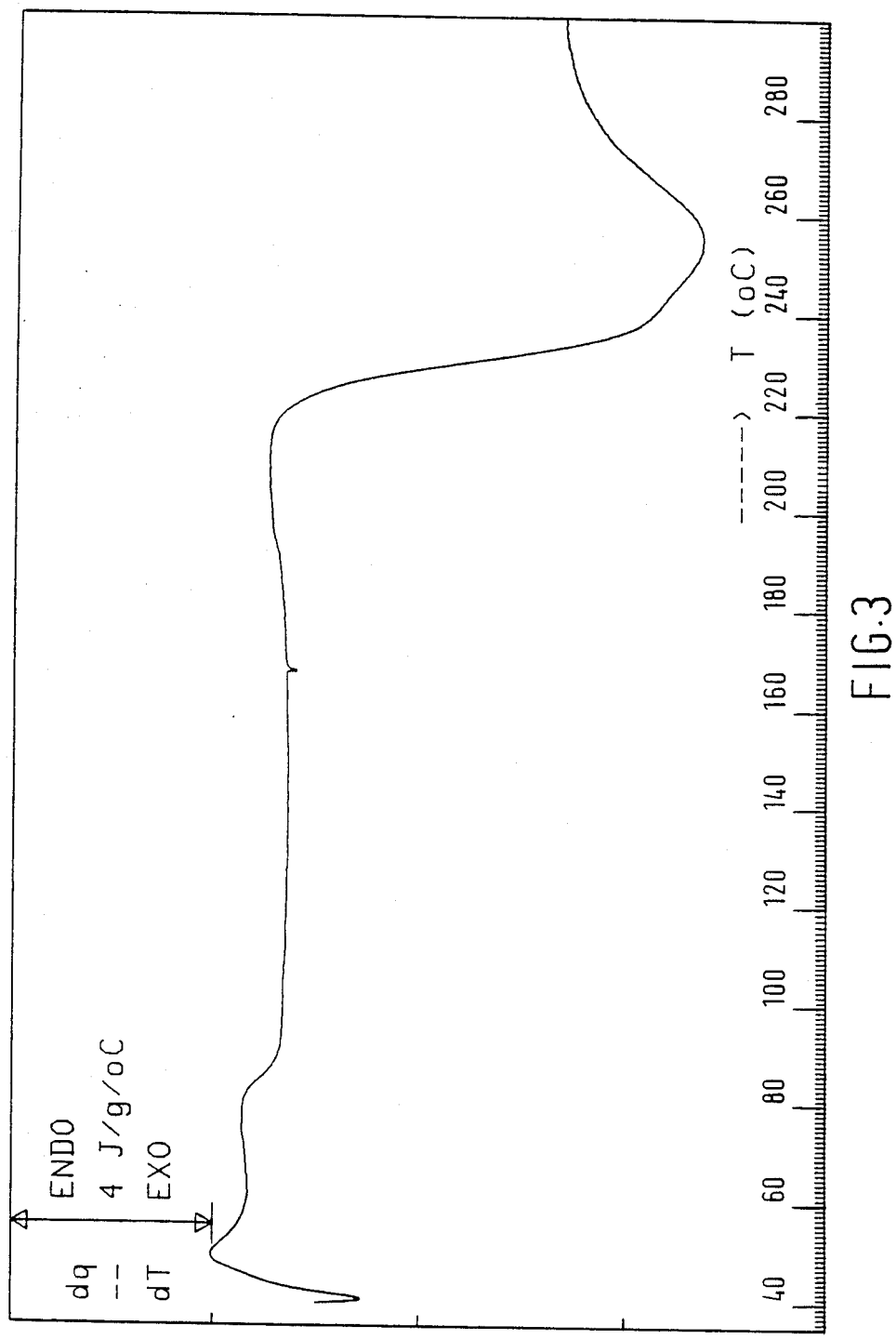

FIG. 3 again shows a DSC curve, but now over a larger temperature range.

EXAMPLE 9

The polymer composition of Example 1 (5 parts) was mixed with a propylene copolymer (Stamylan 56 M 10) (90 parts) and SBS (5 parts). The resulting mixture was injection moulded to form roadside reflector poles. These poles were subjected to the crack-toughness test as described in Kunststoffe, 70 (1980), 12, pp. 844–849. The specific strain according to this test was 8.6%, which means that the material is tough.

EXAMPLE 10

Mixtures of standard propylene copolymer and HDPE were made with different proportions of HDPE (10–40%) and 3% of the product of Example 5. These mixture were injected moulded to form roadside reflector poles, which could be hammered into the ground at temperatures below 0° C. without breakage.

EXAMPLE 11

96 parts of commercial PVC and 4 parts of the product of Example 5 were mixed at 260° C. and extruded to form corrugated sheeting. The resulting product had a high impact resistance, and could be nailed without any problems. Also, no trace of burning was observed, in spite of the very extreme conditions, certainly for PVC.

EXAMPLE 12

98 parts of PVC coloured with black for the manufacture of gramophone records was mixed at 260° C. with 2 parts of the product of Example 5. From the resulting mixture, gramophone records were pressed. These had an excellent sound quality and were completely antistatic. During production no convexity occurred, which with conventional products is responsible for about 2% rejects.

EXAMPLE 13

On the basis of 70 parts of commercial high-density polyethylene and 30 parts of commercial nylon 6, as well as 4 parts of the product of Example 5, a mixture was prepared at a temperature of 260° C., which mixture was found to be homogeneously blended. Thick-walled containers injection moulded from this blend, for example, beer caskes , had good gas barrier characteristics (0.346 mm.cm$^3$/(m$^2$.d.bar), at 0° C.).

EXAMPLE 14 and Comparative Example 1

97.5 parts of a standard type of homopolypropylene was mixed with 2.5 parts of the product of Example 5. After the extrusion of test bars, a number of mechanical properties were determined. These are specified in the following Table B, together with the same properties for a propylene-ethylene copolymer (comparative Example 1).

TABLE B

| Example | 14 | 1 (comparative) |
|---|---|---|
| Melt flow index (190° C./5') | 6.3 | 6.3 |
| Shore D hardness | 63 | 62 |

TABLE B-continued

| Example | 14 | 1 (comparative) |
|---|---|---|
| Ball hardness | 39 | 34 |
| Izod Impact Strength | | |
| −50° C. | 4 | 4 |
| 0° C. | 59 | 59 |
| 20° C. | 70 | 71 |
| Vicat temp. °C | 141 | 136 |

This table shows that the addition of a minor proportion of the polymer composition according to the invention to standard polypropylene gives a pattern of properties comparable to a (much more expensive) propylene ethylene copolymer.

EXAMPLES 15 and 16; COMPARATIVE EXAMPLES 2-5

On the basis of, respectively, chlorobutyl rubber and nitrile rubber, six mixtures were made, the compositions and mechanical properties of which are specified in the following Table C (all quantities in parts by weight).

TABLE C

| Example | 2* | 3* | 15 | 4* | 5* | 16 |
|---|---|---|---|---|---|---|
| Chlorobutyl rubber | 100 | 90 | 90 | — | — | — |
| Nitrile rubber | — | — | — | 100 | 90 | 90 |
| EPDM rubber | — | 10 | — | — | 10 | — |
| Product of Example 5 | — | — | 10 | — | — | 10 |
| Hardness (Shore A) | 30 | 30 | 32 | 49 | 50 | 52 |
| Modulus (300°/0, kg/cm$^2$) | 7 | 7 | 16 | — | — | — |
| Tensile strength (kg/cm$^2$) | 16 | 18 | 25 | 22 | 31 | 41 |
| Elongation at break (%) | 525 | 575 | 410 | 315 | 305 | 355 |

*comparative.

This table clearly shows that the same product according to Example 5 in different rubbers may have quite different effects.

EXAMPLE 17

98 parts of standard polypropylene copolymer were mixed with 2 parts of an aluminium powder master batch consisting of 70 parts of Al powder and 30 parts of the product of Example 5. After mixing and injection moulding, a completely uniform distribution of the Al powder throughout the polypropylene was obtained.

EXAMPLE 18 and Comparative Example 6

An SBS mixed with conventional additives, and a mixture of 90 parts of SBS with 10 parts of the product of Example 1 with the same additives were subjected to an ozone test (50 pphm, 20° C., 120 hours, elongation 20%).

In the test, SBS reached 21 hours (comparative Example 6). The mixture (Example 8) reached more than 120 hours. For comparison it may be noted that a hydrogenated SBS (Kraton G) in this test scored 72 hours.

EXAMPLES 19-21 and COMPARATIVE EXAMPLES 7-9

Two types of "crystal polystyrene" incorporating the product according to this invention were compared with three types of high-impact polystyrene (HIPS). The results are specified in the following Table D.

TABLE D

| Example | 19 | 20 | 21 | 7* | 8* | 9* |
|---|---|---|---|---|---|---|
| Crystal PS-A | 95 | 97 | — | — | — | — |
| Crystal PS-B | — | — | 95 | — | — | — |
| Product of Example 5 | 5 | 3 | 5 | — | — | — |
| HIPS - A | — | — | — | 100 | — | — |
| HIPS - B | — | — | — | — | 100 | — |
| HIPS - C | — | — | — | — | — | 100 |
| Vicat B (°C.) | 86 | 85 | 92 | 81 | 90 | 80 |
| Impact strength (notched) (20° C., mJ/mm$^2$) | 1.6 | 1.8 | 2.5 | 4 | 9 | 9.5 |
| Impact strength (20° C., mJ/mm$^2$) | 29 | 25 | 30 | 50 | n.b. | n.b. |
| elongation at break | 23 | 10 | 32 | 30 | 50 | 45 |
| gloss | 67 | 79 | 85 | 21 | 18 | 10 |

*comparative

EXAMPLE 22

During the extrusion of ultra-high-molecular polyethylene to form foil, to which 3% of the product of Example 5 had been added, it was found that the head pressure in the extruder and the required power were so much reduced relative to the product without the additive, that it was possible to increase production by 25% without there being any deterioration in product quality.

EXAMPLE 23

At a temperature of 260° C., 15 parts of PVC, 85 parts of propylene copolymer and 4 parts of the product of Example 5 were mixed and injection moulded to form test bars. These bars were brought to combustion by means of a flame. After removal of the flame, the fire went out.

EXAMPLES 24 and 25

A mixture on the basis of 70 parts of propylene copolymer, 30 parts of polystyrene and 5 parts of the product of Example 5 was injection moulded to form test bars 6.05 mm thick. These bars were tested at −20° C. for impact strength, which gave a value of 12.9 mJ/mm$^2$. This value is so high that this product can be used without any problems for making roadside poles, which are required to have good mechanical properties under extreme temperature conditions, both low and high temperatures.

76 parts of a copolymer of propylene with ethylene, 19 parts of SBS and 5 parts of the product of Example 5 was fabricated into test bars in the same way as described above. The impact strength of this product was found to be 12.8 mJ/mm$^2$.

EXAMPLE 26

The same propylene-ethylene copolymer used in Example 25 was mixed with 5% of the product of Example 5. The impact strength at −20° C. was found to be 8.4 mJ/mm$^2$.

EXAMPLE 27 and COMPARATIVE EXAMPLE 10

With an injection moulding machine with a cylinder temperature of 235° C. and a mould temperature of 50°, a mixture consisting of 30% of Vestyron 640-30, 65% Stamylan 65M 10 and 5% of the product of Example 5 was injection moulded. Also, a mixture consisting of 33.4% Vestyron 640-30 and 66.6% Stamylan M 10 was injection moulded.

The product according to the invention exhibited a specific strain $\epsilon_s$ (parallel) of 3.4, while the comparative product had a value of 3.1. The specific strain, $\epsilon_s$ (perpendicular) was, according to the invention 7.8, whereas the comparative product had a value of 5.6. This means that the product according to the invention was tough, whereas the comparative product was brittle.

In the tensile test according to ASTM D-638, the $G_{max}$ of the product according to the invention was 24.3 N/mm$^2$ and the elongation at break 19%. For the comparative product, these values were 25.1 N/mm$^2$ and 12.6%.

COMPARATIVE EXAMPLE 11

In the same way as described in Example 27, a mixture was made of polypropylene and polystyrene. Unlike Example 27, however, the polymer composition was not added as a previously prepared reaction product, but the component ingredients thereof were loosely mixed in with a dry mix. This dry mix, consisting of 70 parts of polypropylene, 30 parts of polystyrene, 2.5 parts of EVA, 2.0 parts of EPDM and 0.5 parts of LLDPE, was supplied to an extruder. The components were not blended during production, and a product having homogeneous product properties could not be obtained.

This shows clearly that it is essential, in accordance with the present invention, that the components of the polymer composition should previously be reacted with each other, and that the good properties must be inherent in this reaction.

EXAMPLES 28 and 29

For the manufacture of half-liter bottles having barrier properties, two plastics compositions were prepared. The first mixture consisted of 15% of nylon-6, 5% of LDPE, 75% of HDPE and 5% of the product of Example 5. The second mixture differed from the first in that 10% of LDPE was present and 70% of HDPE.

From these two mixtures, half-liter bottles were made by blow moulding. These bottles had a good appearance and good barrier characteristics.

EXAMPLES 29, 30 and 31

The following Table E specifies a number of properties of three polystyrene propylene copolymer mixtures with different ratios of polystyrene and propylene copolymer. The table clearly shows that, using the polymer composition according to the present invention, products and polymer blends with good characteristics can be made from such utterly incompatible products.

TABLE E

|  | 29 | 30 | 31 |
|---|---|---|---|
| Polystyrene* | 10 | 20 | 30 |
| propylene copolymer | 85 | 75 | 65 |
| product of Example 5 | 5 | 5 | 5 |
| gloss | 33.5 | 27.7 | 28.0 |
| Shore D | 63 | 64 | 65 |
| Vicat (10 N) | 126 | 120 | 114 |
| $\epsilon_b$(%) | 560 | 110 | 13 |
| Izod + 23° C. (kJ/m$^2$) | 22 | 7.2 | 3.1 |
| Izod −40° C. (kJ/m$^2$) | 2.3 | 1.6 | 1.2 |
| I$_2$ 230/216 (dg/min) | 5 | 4.7 | 4.6 |
| E mod ⊥ + 23° C. (MPA) | 926 | 995 | 1054 |

*medium impact

EXAMPLE 32

From a mixture of 95% of propylene copolymer and 5% of the product according to the invention, child's seats for automobiles were made. The specific strain at −20° C. of the product was 8.4%, which means that the product is tough. These seats were subjected to Dutch standard tests for such products, and obtained official approval.

EXAMPLE 33

A mixture consisting of 80% polypropylene with a melt index of 9, 15% SBS and 5% of the product according to the present invention was used for making roadside poles. The specific strain of this product was 8.7% at −20° C. A large number of these poles have been tested in the Netherlands, and it was found that after one year no ageing could be detected. This is extremely surprising, as both components, polypropylene and SBS, are notorious for being highly prone to ageing. Products made from either polypropylene or SBS are unsuitable for being permanently exposed to weather influences.

EXAMPLES 34-35

From a mixture of 76% propylene copolymer, 19% HDP and 5% of the product of Example 5, a roadside pole was injection moulded. The specific strain of this product was 12.8% at −20° C.

From a mixture of 85% propylene copolymer, 10% SBS and 5% of a product of Example 5, a roadside pole was injection moulded. The specific strain of this product was 9.5% at −20° C.

From a mixture of 90% polypropylene copolymer, 5% SBS and 5% of the product of Example 1, a roadside pole was injection moulded. The specific strain at −20° C. of this product was 8.6%.

EXAMPLES 36 and 37

A grey-coloured vacuum cleaner cap was injection moulded from a mixture consisting of 70 parts of polypropylene, 30 parts of polystyrene and 3 parts of the product of Example 5. A tough product was obtained with a specific strain of 6.9%.

For comparison, the specific strain of ABS commonly used for this kind of applications, is 4.9%.

From a mixture of 65 parts of polypropylene, 35 parts of polystyrene and 5 parts of the product of Example 5, a roadside pole was injection moulded. This product was slightly opalescent and had a specific strain at −20° C. of 12.9%.

EXAMPLES 38-40 and COMPARATIVE EXAMPLE 12

The following tests relate to the injection moulding of buckets from various materials. It is noted beforehand that a high-density polyethylene with a melt index of 7 and a density of 963 is generally unsuitable for this purpose.

A mixture consisting of 45% ground discarded crates consisting of HDPE with a melt index of 7 and a density of 963, 45% propylene copolymer and 10% of the polymer composition according to the present invention, buckets were injection moulded. The specific strain, perpendicular, was 33.5%.

Starting from a mixture of 65% propylene copolymer, 30% polystyrene and 5% of a polymer composition according to Example 5, buckets were injection moulded. The specific strain, perpendicular, was 19.8%.

A mixture of 95% of ground crates, as described above, and 5% of the product of Example 5 was injection moulded to form buckets. The specific strain, perpendicular was 35.1%.

For comparison, a conventional material for injection moulding buckets from HDPE, Stamylan 9089, after injection moulding to buckets has a specific strain, perpendicular, of 34.5%.

The tests described above clearly show that, using the polymer composition according to the invention, it is possible to re-use the material of old bottle crates. It can be processed, for example, to form buckets having particularly good properties.

EXAMPLE 41 and COMPARATIVE EXAMPLE 13

From nylon-6, incorporating 30% glass fibres, so-called threshold plates were injection moulded, and a first test was run without the polymer composition according to the invention and a second test with the material incorporating 5% of the polymer composition according to the invention. The results are specified in the following Table F. With regard to the E modulus, it is noted that, owing to the addition of the polymer composition according to the invention the E modulus decreases somewhat, as the polymer composition has a somewhat rubbery character.

TABLE F

| Example | PA6, threshold plate | Emod $[N/mm^2]$ ∥ | ⊥ |
|---|---|---|---|
| 13* | PA6 (30% glas) | 8781 | 4636 |
| 41 | +5% product of Example 5 | 7892 | 3322 |
|  |  | Izod $[kJ/m^2]$ |  |
| 13* | PA6 (30% glas) | 12.3 | 6.1 |
| 41 | +5% product of Example 5 | 13.0 | 7.2 |

*comparative

EXAMPLE 41A and COMPARATIVE EXAMPLE 13A

In order to determine the effect of the polymer composition according to the invention on the flow behaviour of polyesters, neat PETP and PETP incorporating 5% of the product of Example 5 were injection moulded in a plate mould. The maximum oil pressure required for filling the mould was determined, and found to be 169 bar for the neat PETP, and 162 bar for PETP incorporating 5% of the polymer composition of the present invention.

EXAMPLE 42 and COMPARATIVE EXAMPLE 14

In the same way as described for PETP, the flow behaviour of nylon-6 was determined. For neat nylon-6 the maximum oil pressure was found to be 130 bar, and for nylon-6 incorporating 5% of the polymer composition of this invention 120 bar.

EXAMPLE 43 and COMPARATIVE EXAMPLE 15

The effect of the polymer composition on PETP filled with 36% glass fibres was determined by injection moulding so-called threshold plates. The results are specified in the following Table G.

TABLE G

| Example | E modulus $[N/mm^2]$ | ∥ | ⊥ |
|---|---|---|---|
| 15* | PETP (36% glass) | 14239 | 6198 |
| 43 | PETP + 5% product of Example 5 | 13738 | 5662 |
|  |  | Izod $[kJ/mm^2]$ |  |
| 15* | PETP (36% glass) | 8.2 | 3.7 |
| 43 | PETP + 5% product of | | |

TABLE G-continued

| | Example 5 | 8.5 | 4.3 |
|---|---|---|---|

*comparative

EXAMPLE 44

A mixture of 50 parts of LLDPE (1-butylene copolymer) and 50 parts of polypropylene, extrusion grade, was extruded to form a foil. It turned out to be impossible to obtain sufficient stability of the bubble. After the addition of 5 parts of the product of Example 5, a stable bubble was obtained with a realizable thickness to 6 μm.

EXAMPLE 45

A mixture consisting of 69% LLDPE (butylene copolymer), 19% polypropylene, extrusion grade, 9% nylon-6 and 3% of the product of Example 5, was extruded to form a foil of 7.5μm, which foil possessed good gas barrier properties.

EXAMPLE 46

A mixture consisting of equal parts of polypropylene, polystyrene and SBS was made, to which 5% of the product of Example 5 was added. Electron microscopic examination of articles injection moulded from this mixture showed that hardly, if any, particles of a size of 0.3 μm or more were to be found. This indicates that a particularly good dispersion has been obtained of the various components in each other.

EXAMPLES 48 and 48 and COMPARATIVE EXAMPLES 16 and 17

Two colour master batches were made, respectively consisting of 50% pigment and 50% LDPE (MB1) and 50% pigment, 20% LDPE and 30% of the product of Example 5 (MB2). These two master batches were mixed into ABS and polystyrene, respectively. The results are specified in the following Table H.

TABLE H

| | | Emod $[N/mm^2]$ ∥ | ⊥ | Izod $[kJ/m^2]$ ∥ | ⊥ |
|---|---|---|---|---|---|
| 47 | ABS + 2% MB2 | 2394 | 2012 | 60.7 | 37.7 |
| 16 | ABS + 2% MB1 | 2271 | 1975 | 62.7 | 26.8 |
| 48 | PS + 2% MB2 | 2098 | 1784 | 11.1 | 4.6 |
| 17 | PS + 2% MB1 | 1983 | 1906 | 11.1 | 4.2 |

EXAMPLE 49

On the basis of the product of Example 5, a master batch was made, consisting of 50% pigment and 50% of the product of Example 5. This master batch was admixed, with good results, with nylon-46, glass and clay filled types, and with a mixture of polypropylene and polyethylene.

EXAMPLE 50

A dry mix was made from polypropylene, PBTP, nylon 6, polycarbonate, LDPE, and HDPE, these six components being present in equal quantities. Calculated on the total amount, 5% of the product of Example 5 was added to this mix. The dry blend thus obtained was injection moulded to form a thin-walled article in a conventional injection moulding machine. A homogeneous product was obtained.

It is surprising that, owing to the application of the polymer composition according to the invention, it is possible to make a homogeneous mixture of such fully incompatible products, which mixture can be injection moulded at that.

EXAMPLES 51–53 and COMPARATIVE EXAMPLE 18

The polymer composition according to the invention has also been used for re-processing polycarbonate. This was, in the first place, product which failed to meet the specification and, in the second place, so-called regranulate. The polycarbonate types used were all of injection moulding grade.

For comparison, it was first tried to extrude three types off-spec and one type of regranulate, mixed together, into a conventional plate extrusion line for polycarbonate. It turned out to be impossible to produce a homogeneous plate, and there is a poor start. The screw squeaks in the cylinder.

After the addition of 4% of the product of Example 5 and 2% black master batch on polystyrene basis (dry blend), a beautiful, uniformly black plate is produced. Type change is fast for polycarbonate, while after some time of extrusion the screw ceased to squeak.

The same mixture of polycarbonate waste was used for an ABS polycarbonate mixture. The mixture contained equal parts of polycarbonate and ABS (Lustran QE 110 black), and further 5% of the product of Example 5. Without any problems, a beautiful, satiny plane plate was obtained.

Subsequently, a mixture was made from equal parts of the above polycarbonate scrap, ABS and propylene copolymer, with the mixture containing a total proportion of 5% of the product of Example 5. Here again, a beautiful plate was obtained, having good mechanical properties.

The material properties of the plates according to the various examples are summarized in the following Table K.

TABLE K

| Material properties | $G_{break}[N/mm^2]$ | $\epsilon_{break}(\%)$ | $G_{max}[N/mm^2]$ | $\epsilon_{G\,max}(\%)$ | $\epsilon_b[N/mm^2]$ |
|---|---|---|---|---|---|
| PC 18* | 59.6 | 69 | 62.7 | 6.8 | 2544 |
| PC + product Example 5 | 47 | 25 | 58.3 | 6.5 | 2315 |
| PC +ABS + product Example 5 | 40 | 39 | 41.6 | 10 | 2187 |
| PC + ABS + PP + product Example 5 53 | 37.7 | 9.7 | 39.4 | 6.6 | 2003 |

*comparative

EXAMPLES 54 and 55

On the basis of 70 parts of low-density polyethylene, 30 parts of nylon-6 and 4 parts of the product of Example 5, and on the basis of 90 parts of low-density polyethylene, 10 parts of nylon-6 and 4 parts of the product of Example 5, two synthetic resin batches were made. The batches were mixed at 260° C., and were both excellent to process. The mixture containing 70 parts of LDPE was in particular suitable for thick-walled containers, such as beer caskes, and the mixture with 90 parts of LDPE was suitable for being fabricated into foil and thin-walled containers, such as bottles. The products on the basis of both mixtures possessed excellent gas barrier properties.

EXAMPLE 56

70 parts of propylene copolymer, 30 parts of PBTP and 4 parts of the product of Example 5 were mixed at 260° C. and injection moulded to form bottles and thick-walled containers. The products were excellently suitable for the injection moulding process and possessed good gas barrier properties.

EXAMPLE 57

70 parts of nylon-6, 30 parts of ABS and 4 parts of the product of Example 5 were mixed. The resulting mixture was homogeneous and was used for injection moulding automobile parts at a temperature of 260° C. In spite of the extreme conditions, no decomposition of ABS occurred.

EXAMPLE 58 and COMPARATIVE EXAMPLE 19

Commercial ABS was injection moulded at the usual processing temperature in a mould for number plate mounts. The screw configuration and the mould construction turned out to be such that the mould could not be completely filled (Comparative Example 19).

The same ABS, to which, however, 1% of the product of Example 5 had been added, could be injection moulded without any problems, while excellent products were obtained. The mould was completely filled.

I claim:

1. A polymer composition comprising a chemical reaction product obtained by high shear reacting at a temperature of at least 150° C. a mixture consisting essentially of:
   (a) 30–70 parts by weight of one or more ethylenepropylene-diene rubbers,
   (b) 30–70 parts by weight of one or more ethylenevinyl acetate copolymers with a vinyl acetate content of 18–40% by weight,
   (c) 1 to 25 parts by weight of at least one ethylene-olefin-1 copolymer, the olefin-1 containing 4, 5 or 6 carbon atoms, and
   (d) optionally, 1–25 parts by weight of at least one other polymer, with the priviso that the sum of (c) and (d), if any, is 1–25 parts by weight.

2. A polymer composition as claimed in claim 1, characterized by containing as component (d) a styrene butadiene acrylonitrile rubber, a butyl rubber, an isoprene rubber, a polybutadiene rubber, or combinations of two or more of these products.

3. A polymer composition as claimed in claim 2, characterized by comprising one or more ethylene-olefin-1 copolymers, the olefin-1 containing 4 C atoms.

4. A polymer composition as claimed in claim 1, produced by reacting the components at a temperature of between 200° C. and 300° C.

5. A polymer composition as claimed in claim 1, characterized by further comprising one or more waxes.

6. A polymer composition as claimed in claim 5, characterized by comprising at least one polypropylene wax.

7. A polymer composition as claimed in claim 6, characterized by comprising at least two polypropylene waxes having different melt flow indices.

8. A polymer composition as claimed in claim 1, characterized in that component (a) comprises at least one ethylene-propylene-diene rubber having green strength.

9. A polymer composition as claimed in claim 1, characterized by further comprising a heat stabilizer and/or an antioxidant.

10. A process for producing a polymer composition as claimed in claim 1 which comprises supplying to the intake zone of an extruder
(a) at least one ethylene-propylene-diene rubber and
(b) at least one ethylene-vinyl acetate copolymer with a vinyl acetate content of 18–40% by weight;
(c) one or more ethylene-olefin-1 copolymer and
(d) optionally one or more other polymeric additives; and reacting the same therein, with mixing, at elevated temperature; discharging the reaction product from the extruder, cooling it, and granulating it.

11. A colour master batch for colouring synthetic resins, characterized by comprising a polymer composition as claimed in claim 1 mixed with a coloring material.

12. A polymer composition as claimed in claim 1, wherein said ethylene-olefin-1 copolymer is a member selected from the group consisting of an ethylene-butene-1 copolymer, an ethylene-hexene-1 copolymer, and mixtures thereof.

* * * * *